US012650938B2

(12) United States Patent
Eshel-Goldman et al.

(10) Patent No.: US 12,650,938 B2
(45) Date of Patent: Jun. 9, 2026

(54) MULTI-BANK MEMORY THAT SUPPORTS MULTIPLE READS AND MULTIPLE WRITES PER CYCLE

(71) Applicant: Marvell Israel (M.I.S.L) Ltd., Yokneam (IL)

(72) Inventors: Noam Eshel-Goldman, Tel-Aviv (IL); Yael Rozin, Rannana (IL); Moshe Bachar, Herzeliya (IL); Rami Zemach, Givat Shapira (IL)

(73) Assignee: Marvell Israel (M.I.S.L) Ltd., Yokneam (IL)

(*) Notice: Subject to any disclaimer, the term of this patent is extended or adjusted under 35 U.S.C. 154(b) by 0 days.

(21) Appl. No.: 18/886,567

(22) Filed: Sep. 16, 2024

(65) Prior Publication Data

US 2025/0094367 A1 Mar. 20, 2025

Related U.S. Application Data

(60) Provisional application No. 63/538,488, filed on Sep. 14, 2023.

(51) Int. Cl.
*G06F 13/18* (2006.01)
*G06F 13/16* (2006.01)

(52) U.S. Cl.
CPC .......... *G06F 13/18* (2013.01); *G06F 13/1673* (2013.01); *G06F 13/1689* (2013.01)

(58) Field of Classification Search
CPC ... G06F 13/18; G06F 13/1673; G06F 13/1689
USPC .......................................................... 711/158
See application file for complete search history.

(56) References Cited

U.S. PATENT DOCUMENTS

| | | | |
|---|---|---|---|
| 4,870,643 | A | 9/1989 | Bultman |
| 5,414,455 | A | 5/1995 | Hooper |
| 5,508,732 | A | 4/1996 | Bottomley |
| 5,581,479 | A | 12/1996 | Mclaughlin |
| 5,621,882 | A | 4/1997 | Kakuta |
| 6,185,662 | B1 | 2/2001 | Beyerlein |
| 6,311,251 | B1 | 10/2001 | Merritt |
| 6,397,324 | B1 | 5/2002 | Barry |

(Continued)

FOREIGN PATENT DOCUMENTS

CN 103455281 B 1/2018

OTHER PUBLICATIONS

International Search Report and Written Opinion for PCT No. PCT/IB2024/059004, mailed Dec. 4, 2024 (17 pages).

*Primary Examiner* — Jared I Rutz
*Assistant Examiner* — Wei Ma

(57) ABSTRACT

In a memory system having a plurality of memory banks, a plurality of memory access requests having a first priority level and a plurality of memory access requests having a second priority level different are received. A set of first memory banks executes the multiple memory access requests having the first priority level during a first clock cycle. The memory system determines one or more second memory banks that are not executing memory access requests having the first priority level during the first clock cycle. In response to determining the one or more second memory banks that are not executing memory access requests having the first priority level during the first clock cycle, the one or more second memory banks execute one or more memory access requests having the second priority level during the first clock cycle.

23 Claims, 4 Drawing Sheets

(56) References Cited

U.S. PATENT DOCUMENTS 6,557,053 B1 4/2003 Bass
7,061,909 B2 6/2006 Blanc
7,082,502 B2 7/2006 Najam
7,149,139 B1* 12/2006 Rosen ....................... G06F 5/16 365/233.17
7,313,721 B2 12/2007 Ashmore
7,428,618 B2 9/2008 Najam
7,437,472 B2 10/2008 Rose
7,451,467 B2 11/2008 Carver
7,802,028 B2 9/2010 Andersen
8,266,408 B2 9/2012 Iyer
8,358,651 B1 1/2013 Kadosh
8,514,651 B2 8/2013 Levy
8,724,423 B1* 5/2014 Zhou .................... G11C 7/1075 365/233.17
8,995,210 B1 3/2015 Hagspiel
9,105,318 B2 8/2015 Chang
10,089,018 B2 10/2018 Bromberg
11,099,746 B2 8/2021 Bromberg
2003/0046477 A1 3/2003 Jeddeloh
2003/0120861 A1 6/2003 Calle
2005/0066135 A1 3/2005 Yoshida
2006/0224916 A1 10/2006 Makita
2006/0282588 A1 12/2006 Proujansky-bell
2008/0244135 A1* 10/2008 Akesson ............. G06F 13/1626 710/241
2009/0164696 A1 6/2009 Allen
2010/0153636 A1 6/2010 Huang et al.
2011/0138100 A1 6/2011 Sinclair
2011/0258362 A1 10/2011 Mclaren
2011/0289256 A1 11/2011 Bartlett
2012/0079155 A1* 3/2012 Damodaran ........ G06F 11/1064 710/244
2012/0127818 A1 5/2012 Levy
2012/0144103 A1 6/2012 Ko
2013/0205183 A1 8/2013 Fillingim
2013/0326149 A1 12/2013 Barrell
2014/0047197 A1 2/2014 Kokrady
2014/0177324 A1 6/2014 Liu
2014/0282514 A1 9/2014 Carson
2014/0362651 A1 12/2014 Chang
2016/0162359 A1 6/2016 Kittner
2016/0328158 A1* 11/2016 Bromberg ............. G06F 3/0659
2017/0364408 A1 12/2017 Sherman et al.

* cited by examiner

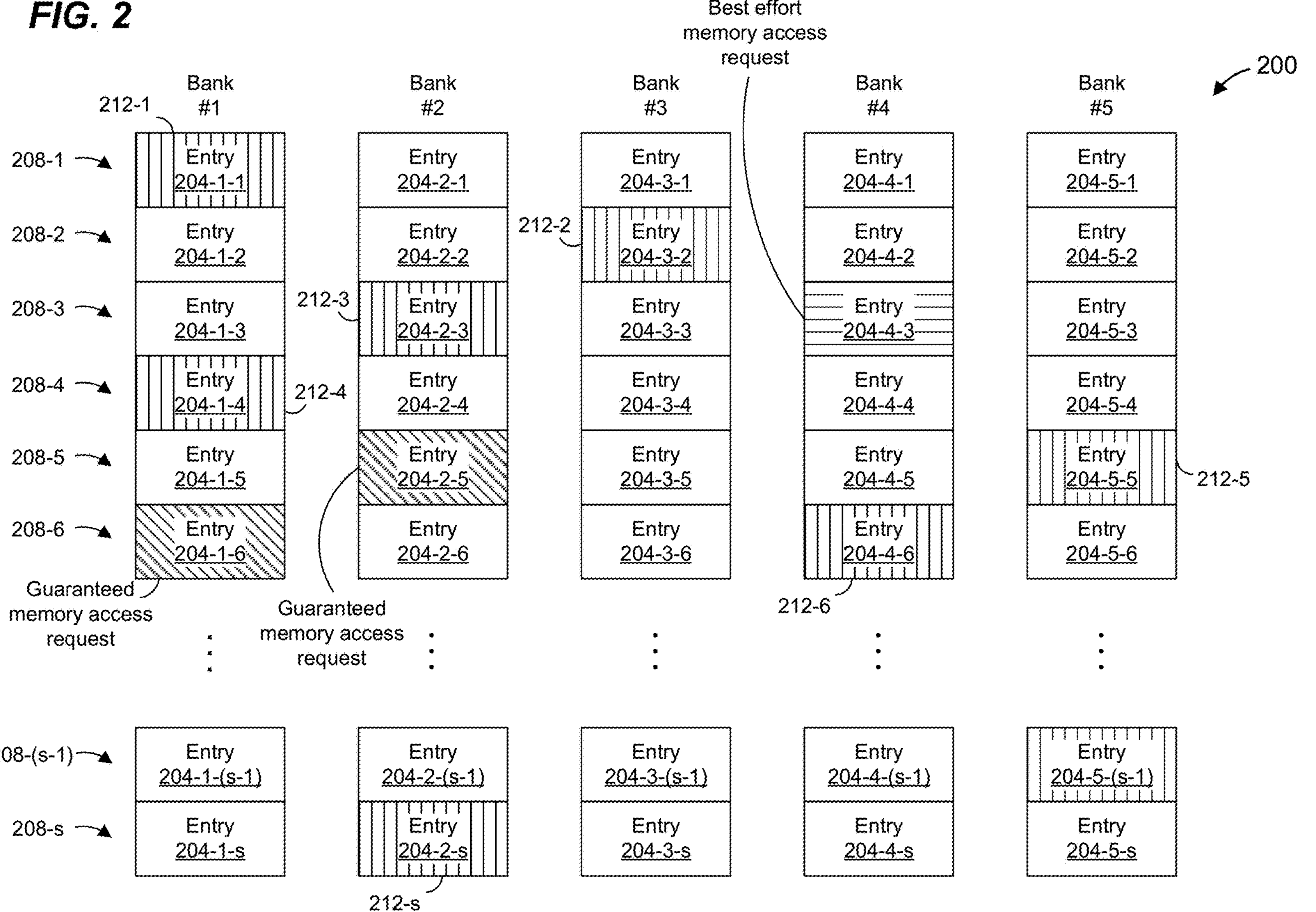
FIG. 2
200
Bank #1
Bank #2
Bank #3
Bank #4
Bank #5
Entry 204-1-1
Entry 204-1-2
Entry 204-1-3
Entry 204-1-4
Entry 204-1-5
Entry 204-1-6
Entry 204-1-(s-1)
Entry 204-1-s
Entry 204-2-1
Entry 204-2-2
Entry 204-2-3
Entry 204-2-4
Entry 204-2-5
Entry 204-2-6
Entry 204-2-(s-1)
Entry 204-2-s
Entry 204-3-1
Entry 204-3-2
Entry 204-3-3
Entry 204-3-4
Entry 204-3-5
Entry 204-3-6
Entry 204-3-(s-1)
Entry 204-3-s
Entry 204-4-1
Entry 204-4-2
Entry 204-4-3
Entry 204-4-4
Entry 204-4-5
Entry 204-4-6
Entry 204-4-(s-1)
Entry 204-4-s
Entry 204-5-1
Entry 204-5-2
Entry 204-5-3
Entry 204-5-4
Entry 204-5-5
Entry 204-5-6
Entry 204-5-(s-1)
Entry 204-5-s
208-1
208-2
208-3
208-4
208-5
208-6
208-(s-1)
208-s
212-1
212-2
212-3
212-4
212-5
212-6
212-s
Guaranteed memory access request
Guaranteed memory access request
Best effort memory access request Best Effort Read Request
Guaranteed Read Request
Best Effort Request FIFO 308
Selector 312
Memory Bank 304
Delay Line 320
Demultiplexer 328
Guaranteed Read Output
Best Effort Read Output
Best Effort Read FIFO 324
Arbitrator 340
Best Effort Read Outputs from Other Memory Banks
Best Effort Read Outputs from Multiple Memory Banks
300

FIG. 4
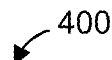
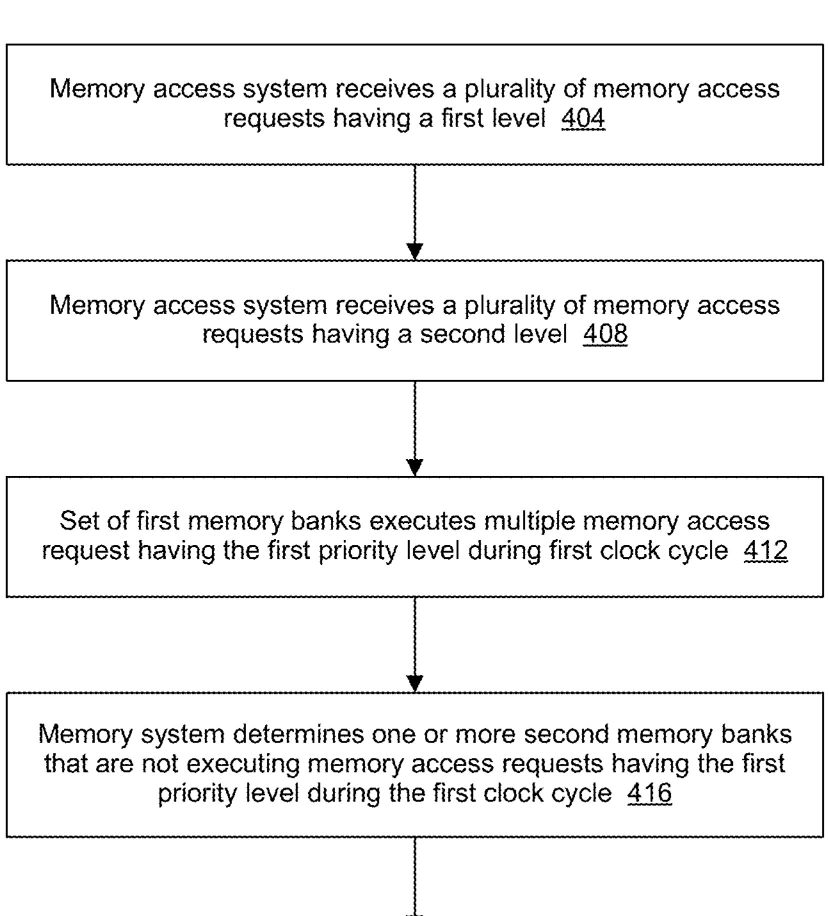

MULTI-BANK MEMORY THAT SUPPORTS MULTIPLE READS AND MULTIPLE WRITES PER CYCLE

CROSS REFERENCES TO RELATED APPLICATIONS

This application claims the benefit of U.S. Provisional Patent App. No. 63/538,488, entitled "Opportunistic Memory Read," filed on Sep. 14, 2023, the disclosure of which is expressly incorporated herein by reference in its entirety for all purposes.

FIELD OF TECHNOLOGY

The present disclosure relates generally to communication networks, and more particularly to concurrently performing operations in a memory of a network device.

BACKGROUND

Conventional single-port memory devices are configured so that during any given clock cycle only a single memory operation, such as a read operation, can be performed by the memory device. In the context of some networking or switching applications, various data that is used for packet processing, for example control tables, forwarding tables and the like, are shared among various switching devices or switching cores of a single device. These multiple devices and cores together offer the ability to switch among a large number of ports. However, limitations on the ability of the multiple devices and cores to speedily access data stored in a shared memory can result in a reduction of switching capabilities. One alternative is to use multi-port memory devices that are configured to service multiple memory access requests in a single clock cycle. Multi-port memory devices, however, are significantly more expensive than single-port memory devices. Additionally, multi-port memory devices are also limited in the number of memory access requests that can be serviced in a single clock cycle. As another alternative, each switching device/core of a network device is provided with its own memory device, but the increase in the number of memory devices increases costs both in terms of the direct cost of the additional memory as well as in terms of circuit resources required to keep information in the different memories synchronized. As yet another alternative, a memory system mimics a multi-port memory with the use of multiple single-port memory banks. For example, one of the memory banks (a parity bank) stores parity data regarding data stored in other memory banks (data banks). If two read requests to a first data bank are received at the same time, one of the read requests is serviced by the first data bank, and the other read request is serviced by reconstructing data stored in the first data bank using an error correction algorithm applied to data read from one or more second data banks and parity data from the parity bank.

SUMMARY

In an embodiment, a memory system, comprises: a plurality of memory banks; and circuitry configured to: receive a plurality of memory access requests having a first priority level, receive a plurality of memory access requests having a second priority level different than the first priority level, forward multiple memory access requests having the first priority level to a set of first memory banks to be executed by the set of first memory banks during a first clock cycle, determine one or more second memory banks that are not executing memory access requests having the first priority level during the first clock cycle, and in response to determining the one or more second memory banks that are not executing memory access requests having the first priority level during the first clock cycle, forward one or more memory access requests to the one or more second memory banks to be executed by the one or more second memory banks during the first clock cycle.

In another embodiment, a method is for executing memory access requests by a memory system having a plurality of memory banks. The method includes: receiving a plurality of memory access requests having a first priority level; receiving a plurality of memory access requests having a second priority level different than the first priority level; executing, by a set of first memory banks, multiple memory access requests having the first priority level during a first clock cycle; determining, by the memory system, one or more second memory banks that are not executing memory access requests having the first priority level during the first clock cycle; and in response to determining the one or more second memory banks that are not executing memory access requests having the first priority level during the first clock cycle, executing, by the one or more second memory banks, one or more memory access requests having the second priority level during the first clock cycle.

BRIEF DESCRIPTION OF THE DRAWINGS

FIG. 2 is a simplified diagram that schematically illustrates an example configuration of memory banks in a memory system such as the memory system of FIG. 1, according to an embodiment.

FIG. 4 is a flow diagram of an example method for executing guaranteed memory access requests and best effort memory access requests in a single clock cycle, according to an embodiment.

DETAILED DESCRIPTION

In embodiments described below, a memory system of a network device includes a plurality of memory banks. When a memory bank is not executing a guaranteed memory access request during a clock cycle, the memory system may direct the memory bank to execute a best-effort memory access request during the clock cycle. A guaranteed memory access request is a memory access request that the memory system is configured to execute during a particular clock cycle; and a best-effort memory access request is a memory access request that the memory system may execute during a particular clock cycle but may also defer to a subsequent clock cycle, according to an embodiment. For example, the memory system defers execution of a best-effort memory access request to a subsequent clock cycle when a memory bank corresponding to the best-effort memory access request is busy during a current clock cycle executing a guaranteed memory access request, according to an embodiment.

In embodiments described below, the memory system is configured to execute at most a maximum number of guaranteed memory access requests during a single clock cycle, where the guaranteed memory access request(s) occupy a subset of memory banks among the plurality of memory banks. Additionally, the memory system is configured to issue one or more best-effort memory access requests during the single clock cycle to one or more memory banks that are not occupied with the guaranteed memory access request(s) during the single clock cycle, according to some embodiments. Accordingly, the memory system is configured to execute more memory access requests during a single clock cycle as compared to a prior memory system capable of executing at most the maximum number of guaranteed memory access requests during the single clock cycle, and thus the memory system provides improved throughput, at least in some embodiments.

Figure 1:
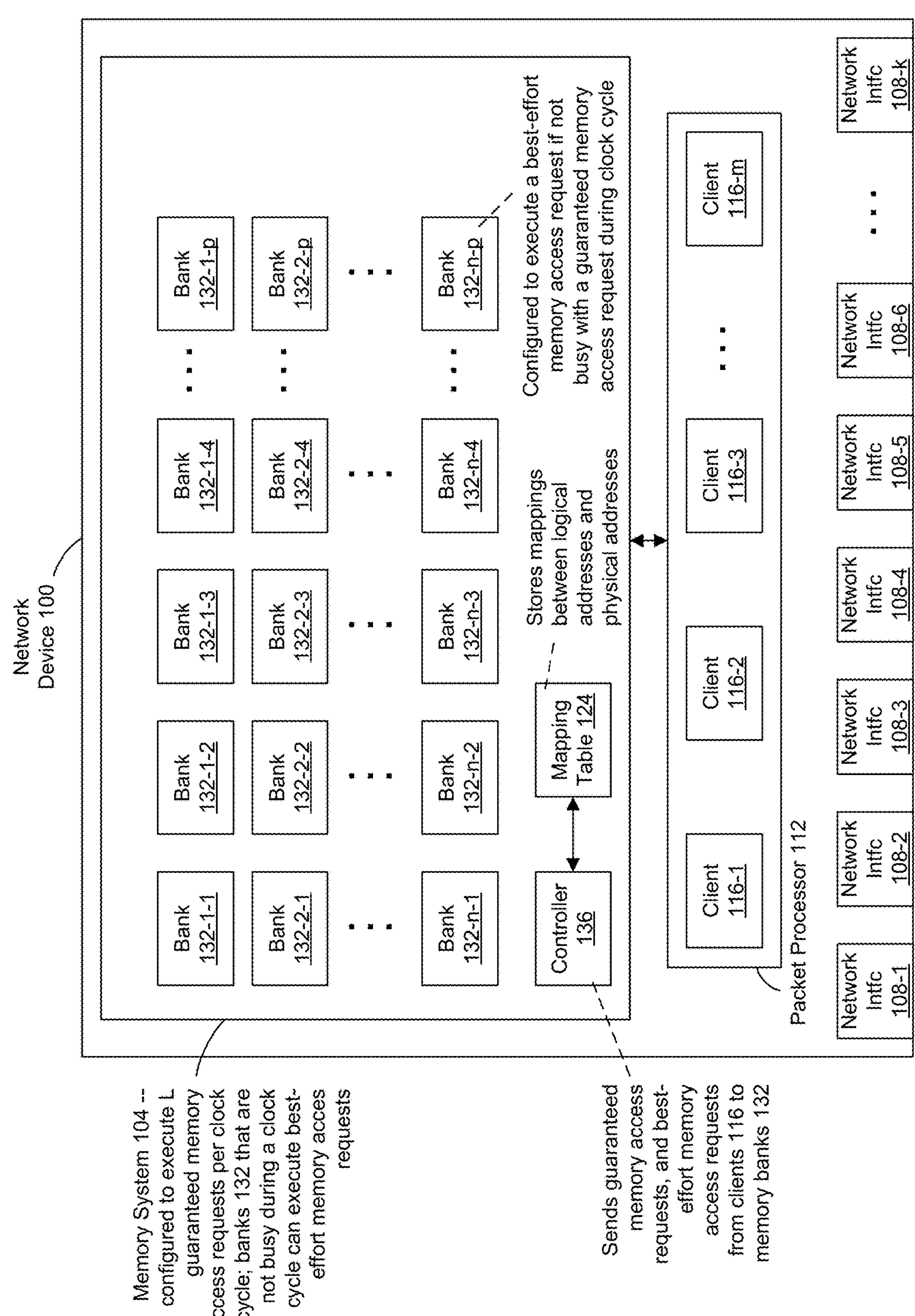
FIG. 1 is a simplified block diagram of an example network device that includes a memory system configured to execute guaranteed memory access requests and best effort memory access requests in a single clock cycle, according to an embodiment.

FIG. 1 is a simplified block diagram of an example network device 100 that includes a memory system 104 configured to execute guaranteed memory access requests and best effort memory access requests in a single clock cycle, according to an embodiment. The example network device 100 comprises a network switch, a router, a bridge, etc., that receives, processes, and forwards packets in a communication network, in an embodiment.

The network device 100 comprises a plurality of network interfaces 108 that are configured to communicatively couple to a plurality of network links to transmit and receive packets. The network device 100 also includes a packet processor 112 that is configured to analyze headers of packets received via the plurality of network interfaces 108 to determine network interfaces 108 via which the packets are to be forwarded. The packet processor 112 comprises a plurality of circuits 116 that are configured to write to and/or read from the memory system 104, and thus the circuits 116 are referred to herein as "clients" of the memory system 104 and or as the "clients 116." Clients 116 comprise various processing circuits or processing elements (sometimes referred to as "processing engines"). In some embodiments, at least some of the clients 116 correspond to processing elements of a packet processing pipeline. In other embodiments, at least some of the clients 116 correspond run to completion processors. More generally, the clients 116 comprise any suitable circuitry that writes data to and/or reads data from the memory system 104.

The memory system 104 comprises a plurality memory units 132 that are referred to herein as memory banks 132, a controller 136, and a mapping table 140 that stores associations between logical addresses and physical addresses (e.g., logical-to-physical mappings) corresponding to the memory banks 132. More specifically, the mapping table 140 maps logical addresses (as specified in read and write commands issued by the clients 116) to physical addresses (physical storage locations in the memory banks 132). The controller 136, also referred to herein as control logic, manages the storage of data in memory banks 132, and communicates with the clients 116.

The memory banks 132 are illustrated in FIG. 1 are logically arranged as an n-by-p 2-dimensional array, where n and p are suitable positive integers. In other embodiments, the memory banks 132 are logically arranged in another suitable manner, such as a 1-dimensional array (e.g., where n is equal to one), a 3-dimensional array, a 4-dimensional array, etc.

Typically, each memory bank 132 comprises a single-port memory, meaning it is capable of executing a single memory access request, e.g., one read request or one write request, per memory access cycle, which generally corresponds to a clock cycle, in an embodiment. The clock cycles in question are those of a clock signal that clocks memory banks 132. In the present context, clock cycles are also referred to herein as memory-access cycles, and the two terms are used interchangeably herein. In the present example, each memory bank 132 comprises a single-port Static Random Access Memory (SRAM). Alternatively, however, memory banks 132 are implemented using any other suitable type of memory, e.g., a Dynamic Random Access Memory (DRAM), a solid state memory, register banks, etc.

Although each memory bank 132 is capable of executing no more than a single memory access request per clock cycle, according to an embodiment, the memory system 104 as a whole is configured, as will be explained further below in more detail, to execute up to J memory access requests having a first priority level per clock cycle, where the first priority level is from a plurality of priority levels associated with memory access requests. In an embodiment, memory access requests having the first priority level are referred to herein as "guaranteed" memory access requests, whereas memory access requests having a second priority level, from among the plurality of priority levels, are referred to herein as "best effort" memory access requests. The memory system 104 is configured to execute, in addition to executing the J guaranteed memory access requests, one or more best effort memory access requests per clock cycle, in an embodiment. The J guaranteed memory access requests are executed during the clock cycle by a first subset of memory banks, and the one or more best effort memory access requests are executed during the clock cycle by a second subset of memory banks that are distinct from the first subset of memory access request, in an embodiment.

In an embodiment, the memory system 104 as a whole is configured, as will be explained further below in more detail, to execute up to K guaranteed read requests and up to L guaranteed write requests, where K and L are respective predefined integer numbers, and where K+L=J.

During each of at least some clock cycles, the controller 136 sends to the memory banks 132 i) up to J guaranteed memory access requests and, optionally, ii) one or more best effort memory requests, according to an embodiment. In an embodiment, the controller 136 is configured to selectively forward a guaranteed memory access request and a best effort memory access request to a memory bank 132 during a same clock cycle. In an embodiment, each memory bank 132 includes, or is otherwise associated with, respective circuitry that is configured to store a best effort memory access request in a respective buffer in response to receiving the best effort memory access request and the guaranteed memory access request in a same clock cycle; and the respective circuitry is configured to provide the best effort memory access request to the corresponding memory bank for execution during a subsequent clock cycle in which the memory bank is not executing a guaranteed memory access request. In an embodiment, the circuitry included in, or otherwise associated with, the respective memory bank 132 is configured to cause the respective memory bank to selectively execute a best effort memory access request during a clock cycle depending on whether the memory bank 132 is executing a guaranteed memory access request during the clock cycle. For example, when the respective memory bank 132 is executing a guaranteed memory access request during the clock cycle, the associated circuitry does not prompt the respective memory bank 132 to execute the best effort memory access request during the clock cycle, but rather stores the best effort memory access request in a buffer to execution in a subsequent clock cycle; and when the respective memory bank 132 is not executing a guaranteed memory access request during the clock cycle, the associated circuitry prompts the respective memory bank 132 to execute the best effort memory access request (or a previously received best effort memory access request from the buffer) during the clock cycle, according to an embodiment.

In another embodiment, during each of at least some clock cycles, the controller 136 sends to the memory banks 132 i) up to J guaranteed memory access requests to a first subset of memory banks 132, and optionally, ii) one or more best effort memory requests to a second subset of memory banks 132 that is distinct from the first subset of memory banks 132. For example, during each of at least some clock cycles, the controller 136 selectively sends to a particular memory bank 132 a best effort memory access request depending on whether the controller 136 is sending a guaranteed memory access request to the particular memory bank 132. For example, when the controller 136 sends a guaranteed memory access request to a particular memory bank 132 during a clock cycle, the controller 136 does not send a best effort memory access request to the particular memory bank 132 during the clock cycle, but rather stores the best effort memory access request in a buffer to be sent to the particular memory bank 132 in a subsequent clock cycle; and when the controller 136 does not send a guaranteed memory access request to the particular memory bank 132 during the clock cycle, the controller 136 sends a best effort memory access request to the particular memory bank 132 during the clock cycle, according to an embodiment.

The different components of the network device 100 and the memory system 104 are typically implemented using dedicated hardware circuitry. Alternatively, some elements of network device 100 and/or the memory system 104, e.g., the controller 136 (also referred to as control logic) or parts thereof, may be implemented using a processor that executes machine-readable instructions (e.g., software and/or firmware instructions), or using a combination of dedicated hardware circuitry and machine-readable instructions executed by a processor.

FIG. 2 is a simplified diagram that schematically illustrates an example configuration 200 of memory banks in a memory system such as the memory system 104 of FIG. 1, according to an embodiment, and FIG. 2 is described with reference to FIG. 1. In the illustrative example of FIGS. 2, n=1 and p=5, and the memory banks 132 are denoted BANK #1, BANK #2, . . . . BANK #5. In the example of FIG. 2, the memory system 104 a 1-dimensional array and is configured to execute one read request and one write request per clock cycle, i.e., K=1, L=1, and J=2, according to an embodiment. As discussed above, the memory system 104 comprises a multi-dimensional array of memory banks 132, the parameters K, L, and J have other suitable values.

In the illustrative example of FIG. 2, each memory bank 136 comprises multiple entries 204. Each entry 204 holds a data word or other basic data unit, in an embodiment. Each group of p corresponding entries in the p respective memory banks is referred to as a stripe 208. In other words, the x-th entry of BANK #1, the x-th entry of BANK #2, the x-th entry of BANK #3, the x-th entry of BANK #4 and the x-th entry of BANK #5 are referred to jointly as the x-th stripe 208.

In the present example, in which K=1, the controller 136 designates one of the entries in each stripe 208 to serve as a redundant entry 212. In the general case, in which memory system 104 is designed for executing K write requests per clock cycle, the controller 136 designates K entries in each stripe 208 to serve as redundant entries 212. As will be explained below, the locations of the redundant entries in the stripes are not fixed, but rather vary over time, according to an embodiment.

In some embodiments, each entry 204 is identified by a respective physical address. The collection of the physical addresses is referred to as the physical memory space of memory system 104. The logical memory space of memory system 104, which is the memory space exposed to the clients 116, has a size corresponding to a total number of the non-redundant entries 204. Thus, the logical memory space of memory system 104 is smaller than the physical memory space, in an embodiment. The size of the logical memory space corresponds to a total amount of data that can be stored in the memory system 136, in an embodiment. The difference in size between the logical and physical memory spaces corresponds to a number of redundant entries 212, in an embodiment.

Typically, the clients 116 issue write and read requests that specify logical addresses, and are not aware of the physical addresses in which the data is actually stored. The logical-to-physical mapping table 124 holds the current mapping between each logical address and the corresponding physical address. Control unit 40 uses table 44 to translate between logical and physical addresses when executing write and read commands. Typically, the mapping table 124 also indicates the location of the redundant entry 212 (or multiple redundant entries, for K>1) of each stripe 208.

As will be now explained in detail, the use of redundant entries 212 enables the controller 136 to execute multiple guaranteed memory access requests (e.g., one guaranteed read request and K guaranteed write requests) per clock cycle, even when the memory banks 132 are single-port memories.

With reference to FIG. 2, consider a guaranteed read request and a guaranteed write request that are to be executed in the same clock cycle. If the guaranteed read request and the guaranteed write request access entries 204 that reside in different memory banks 132, the controller 136 is able to execute the guaranteed read request and the guaranteed write request in a straightforward manner. For example, the controller 136 forwards the guaranteed read request and the guaranteed write request to respective memory banks 132, which execute the controller the guaranteed read request and the guaranteed write request in parallel.

If, on the other hand, the guaranteed read request and the guaranteed write request access entries 204 that happen to reside in the same memory bank 132 (referred to herein as a "collision"), the collision has to be resolved because the memory bank 132 can only execute one memory access command per clock cycle. In such an event, the controller 136 executes the guaranteed read request as received from the clients 116, i.e., reads the data from logical address of the entry 204 specified in the guaranteed read request. The guaranteed write request, however, is not executed in the logical address of the entry 204 specified in the guaranteed write request, but rather in the redundant entry 212 of the same stripe 208 corresponding to the logical address of the entry 204 specified in the guaranteed write request. The controller 136 then updates the logical-to-physical mapping table 124 accordingly.

Since for K=1 each stripe 204 has a redundant entry 212, a collision between a guaranteed read request and one guaranteed write request is guaranteed to be resolved successfully. In the general case, each stripe comprises K redundant entries 212. Therefore, even the worst-case collision between a guaranteed read request and K guaranteed write requests, which occurs when all K+1 guaranteed memory access requests are to access the same memory bank 132, is guaranteed to be resolvable.

In the illustrative example of FIG. 2, entry 204-1-6 of Bank #1 and entry 204-2-5 of Bank #2 are involved with respective guaranteed memory access requests during a clock cycle. As a result, Bank #1 and Bank #2 are not available to perform any best effort memory access requests during the clock cycle. On the other hand, Bank #4 is not executing a guaranteed memory access request during the clock cycle, and thus Bank #4 is available to execute a best effort memory access request in connection with entry 204-4-3.

Figure 3:
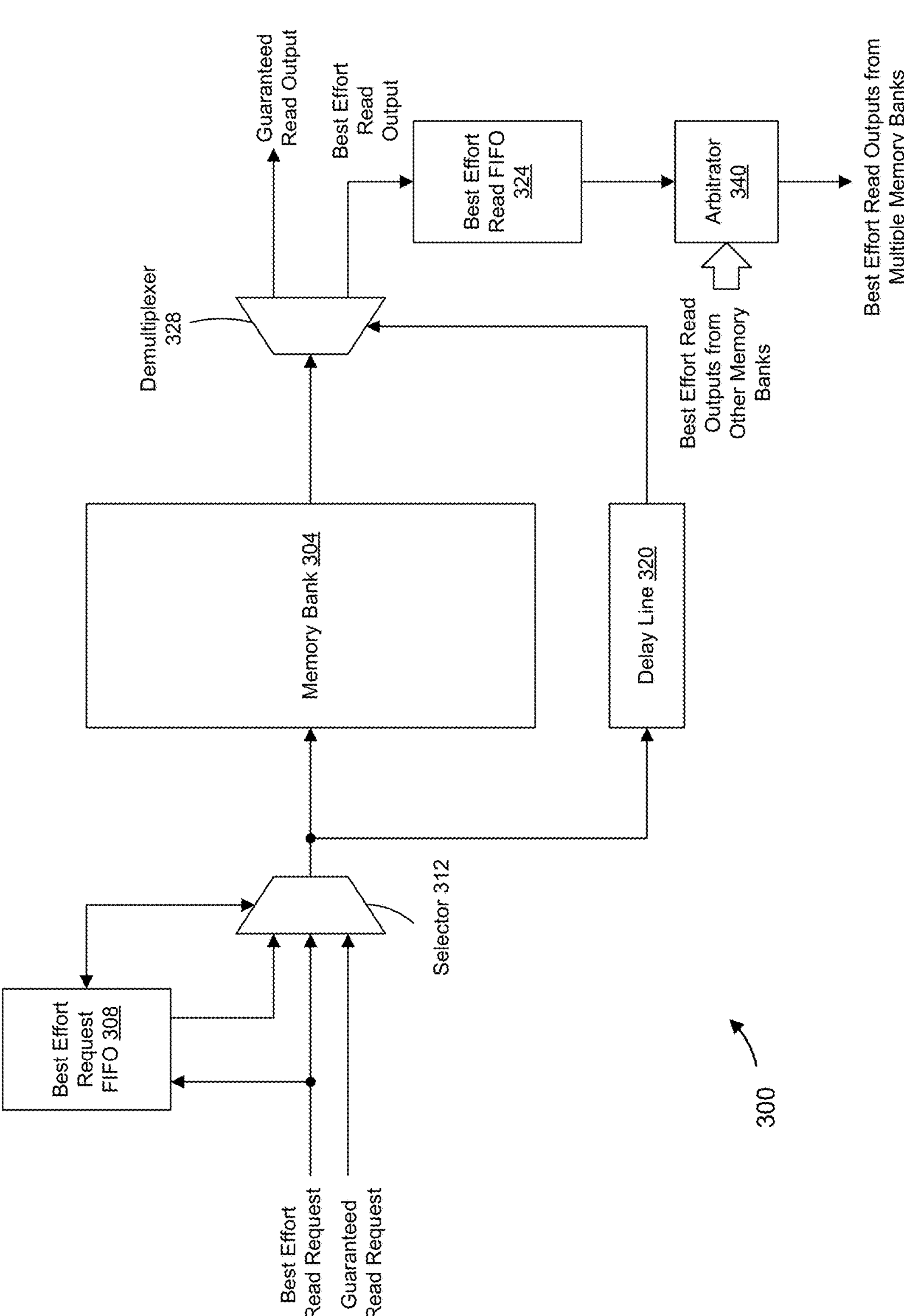
FIG. 3 is a simplified block diagram of circuitry, associated with a memory bank of the memory system of FIG. 1, that is configured to buffer a best effort memory access request when a guaranteed memory access request is also received during a same clock cycle, and to prompt the memory bank to execute the best effort memory access request in a subsequent clock cycle, according to an embodiment.

FIG. 3 is a simplified block diagram of circuitry 300, associated with a memory bank 304, that is configured to buffer a best effort memory access request when a guaranteed memory access request is also received during a same clock cycle, and to prompt the memory bank 304 to execute the best effort memory access request in a subsequent clock cycle, according to an embodiment. In an embodiment, the memory system 104 (FIG. 1) includes a respective instance of the circuitry 300 (or similar circuitry) for each of at least some of the memory banks 132, and FIG. 3 is described with reference to FIG. 1 for explanatory purposes. For example, the memory bank 304 (FIG. 3) corresponds to a respective memory bank 132 (FIG. 1). In other embodiments, the circuitry 300 is included in another suitable network device different than the network device 100 of FIG. 1. In other embodiments, the network device 100 includes other suitable circuitry, different than the circuitry 300, that is configured to buffer a best effort memory access request when a guaranteed memory access request is also received during a same clock cycle, and to prompt the memory bank 132 to execute the best effort memory access request in a subsequent clock cycle.

The circuitry 300 includes a first-in-first-out (FIFO) buffer 308 that is configured to store some best effort read requests from clients 116, for example best effort read requests that are received in a same clock cycle in which guaranteed read request are also received. The circuitry 300 also includes selection circuitry 312 (also referred to herein as the "selector 312") that is configured to i) transfer guaranteed read requests to the corresponding memory bank 304 for execution, ii) and selectively transfer best effort read requests to the corresponding memory bank 304 for execution, and iii) selectively transfer best effort read requests to the FIFO 308.

In an embodiment, the selector 312 is configured to store a received best effort read request to the FIFO 308 in response to receiving the best effort read request and a guaranteed read request in a same clock cycle. In an embodiment, the selector 312 is configured to store a received best effort read request to the FIFO 308 in response to determining that the FIFO 308 is non-empty. In an embodiment, the selector 312 is configured to store a best effort read request to the FIFO 308 in response to at least one of i) receiving the best effort read request and a guaranteed read request in a same clock cycle, and ii) determining that the FIFO 308 is non-empty.

In an embodiment, the selector 312 is configured to retrieve a best effort read request from the FIFO 308 and transfer the retrieved best effort read request to the memory bank 304 in response to determining that i) no guaranteed read request was received in the clock cycle, and ii) the FIFO 308 is non-empty.

In an embodiment, the selector 312 is configured to transfer a received best effort read request to the memory bank 304 in response to determining that i) no guaranteed read request was received in a same clock cycle in which the best effort read request was received, and ii) the FIFO 308 is empty.

The circuitry 300 includes a delay line 320 that receives attribute information regarding read requests provided to the memory bank 304. The attribute information includes information that indicates whether the corresponding read request is a best effort read request, an embodiment. The delay line 320 is configured to output attribute information regarding a read request in connection with the memory bank 304 outputting a result of executing the read request, according to an embodiment.

A FIFO buffer 324 is configured to store results of executing best effort read requests. An input of a demultiplexer 328 is coupled to an output of the memory bank 304. A first output of the demultiplexer 328 corresponds to results of executing guaranteed read requests, and a second output of the demultiplexer 328 corresponds to results of executing best effort read requests. A control input of the demultiplexer 328 is coupled to an output of the delay line 320. The demultiplexer 328 is configured to selectively store results of executing read requests in the FIFO 324. For example, the demultiplexer 328 is configured to select the first output for outputting a result of executing a read request when attribute information corresponding to the read request (e.g., output by the delay line 320) indicates the read request is a guaranteed read request; and the demultiplexer 328 is configured to select the second output for outputting the result of executing the read request (and also to store the result in the FIFO 324) when attribute information corresponding to the read request (e.g., output by the delay line 320) indicates the read request is a best effort read request, according to an embodiment.

An output of the FIFO 324 is coupled to arbitration circuitry 340. The arbitration circuitry 340 is coupled to outputs of multiple FIFOs 324 corresponding to multiple different memory banks 304/132 and is configured to retrieve results of best effort read requests from the multiple FIFOs 324 according to an arbitration algorithm such as round robin, or another suitable arbitration algorithm. The best effort read requests output by the arbitration circuitry 340 are provided to appropriate ones of the clients 116, in an embodiment.

In an embodiment, the FIFO 324 is configured to output multiple results of multiple best effort read requests (e.g., two results of two best effort read requests, or another suitable number greater than two) in a single clock cycle to facilitate draining the FIFO 324 more quickly as compared to an implementation in which the FIFO 324 outputs a single result of a single best effort read request in a single clock cycle.

In some embodiments, the circuitry 300 is configured to selectively forward a best effort read request to the memory bank 304 during a clock cycle further based on whether a guaranteed write request was received during the clock cycle. For example, if a best effort read request and a guaranteed write request are received in the same clock cycle, the circuitry 300 stores the best effort read request in the FIFO 308 and transfers the guaranteed write request to the memory bank 304 for execution, in an embodiment. As another example, if a guaranteed write request is received during a clock cycle and the FIFO 308 is non-empty, the circuitry 300 will not retrieve a best effort read request from the FIFO 308, in an embodiment.

In operation, the circuitry 300 stores a best effort memory access request in the FIFO 308 in response to receiving the best effort memory access request and a guaranteed memory access request in a same clock cycle; and the selector 312 provides the best effort memory access request to the memory bank 304 for execution during a subsequent clock cycle in which the memory bank 304 is not executing a guaranteed memory access request. In an embodiment, the circuitry 300 causes the memory bank 304 to selectively execute a best effort memory access request during a clock cycle depending on whether the memory bank 304 is executing a guaranteed memory access request during the clock cycle. For example, when the respective memory bank 304 is executing a guaranteed memory access request during the clock cycle, the selector 312 does not prompt the memory bank 304 to execute the best effort memory access request during the clock cycle, but rather stores the best effort memory access request in the FIFO 308 for execution in a subsequent clock cycle; and when the memory bank 304 is not executing a guaranteed memory access request during the clock cycle, the selector 312 prompts the memory bank 304 to execute the best effort memory access request (or a previously received best effort memory access request from the FIFO 308) during the clock cycle, according to an embodiment.

FIG. 4 is a flow diagram of an example method 400 for executing memory access requests by a memory system that includes a plurality of memory banks, according to an embodiment. The method 400 is implemented by example memory systems such as described above with reference to FIGS. 1-3, according to an embodiment, and the method 400 is described with reference to FIGS. 1-3 for explanatory purposes. In other embodiments, the method 400 is implemented by another suitable memory system different than the memory systems described above with reference to FIGS. 1-3 and/or in another suitable device different than the network device 100 of FIG. 1. In other embodiments, memory systems such as described above with reference to FIGS. 1-3 implement another suitable method different than the method 400 of FIG. 4.

At block 404, a memory system receives a plurality of memory access requests having a first priority level, and at block 408, the memory system receives a plurality of memory access requests having a second priority level different than the first priority level. For example, the memory system 104 receives memory access requests having a first priority level and memory access requests having a second priority level.

At block 412, a set of first memory banks, among the plurality of memory banks, executes multiple memory access requests having the first priority level during a first clock cycle. For example, a set of memory banks 132 executes multiple guaranteed memory access requests during a first clock cycle. In the example of FIG. 2, Bank #1 and Bank #2 execute guaranteed memory access requests during a first clock cycle.

At block 416, the memory system determines one or more second memory banks that are not executing memory access requests having the first priority level during the first clock cycle. For example, the circuitry 300 associated with each of at least some of the memory banks 132 determines whether the respective memory bank 132/304 is to execute a guaranteed memory access request during a clock cycle.

At block 420, in response to determining at block 416 that the one or more second memory banks that are not executing memory access requests having the first priority level during the first clock cycle, the one or more second memory banks execute one or more memory access requests having the second priority level during the first clock cycle. For example, the circuitry 300 associated with each of at least some of the memory banks 132, in response to receiving a best effort memory access request will execute the best effort memory access request during a clock cycle when the memory bank is not to execute a guaranteed memory access request during the clock cycle.

In an embodiment, the method 400 further comprises: for each of one or more first memory banks in the set of first memory banks: in response to receiving, at respective first circuitry associated with the first memory bank, a first memory access request having the first priority level and a second memory access request having the second priority level in a same clock cycle, storing the second memory access request in a respective buffer associated with the first memory bank for execution by the first memory bank during a subsequent clock cycle.

In an embodiment, the method 400 further comprises: receiving, at first circuitry associated with one of the first memory banks, one of the memory access requests having the first priority level during the first clock cycle; receiving, at the first circuitry, one of the memory access requests having the second priority level during the first clock cycle; in response to the first circuitry determining that the one first memory access request having the first priority level was received during the first clock cycle, storing the one second memory access request having the second priority level in a buffer of the first circuitry; and in response to the first circuitry determining that no memory access requests having the first priority level were received during a second clock cycle that follows the first clock cycle, executing, by the one first memory bank, the one second memory access request having the second priority level during the second clock cycle.

In another embodiment, the method 400 further comprises, in response to the first circuitry determining that no memory access requests having the first priority level were received during a third clock cycle between the first clock cycle and the second clock cycle: retrieving another memory access request having the second priority level from the buffer of the first circuitry during the third clock cycle, the other memory access request having the second priority level having been received prior to receiving the third memory access request; and executing, by the one first memory bank, the other memory access request having the second priority level during the third clock cycle.

In another embodiment, the method 400 further comprises: receiving, at first circuitry associated with one of the second memory banks, one of the memory access requests having the second priority level during the first clock cycle; wherein executing the one or more memory access requests having the second priority level at block 420 comprises executing, by the one second memory bank, the one memory access request having the second priority level that was received during the first clock cycle.

In another embodiment, executing the one memory access request having the second priority level that was received during the first clock cycle is in response at least to the first circuitry determining that no memory access requests having the first priority level were received by the first circuitry during the first clock cycle.

In another embodiment, the method 400 further comprises: receiving, at first circuitry associated with one of the second memory banks, one of the memory access requests having the second priority level during a second clock cycle prior to the first clock cycle; storing, in a buffer of the first circuitry, the one memory access request having the second priority level received during the second clock cycle; and retrieving, from the buffer during the first clock cycle, the one memory access request having the second priority level that was received during the second clock cycle; wherein executing the one or more memory access requests having the second priority level at block 420 comprises executing, by the one second memory bank, the one memory access request having the second priority level that was retrieved from the buffer.

In another embodiment, the method 400 further comprises: for each of at least some of the plurality of memory banks: storing, at a respective buffer associated with the second memory bank, data read from the memory bank in response to executing, by the memory bank, memory access requests having the second priority level; and selecting, by the memory system, an order for outputting data from the respective buffers of the at least some memory banks according to an arbitration algorithm.

In another embodiment, the method 400 further comprises, for each of the at least some of the plurality of memory banks: determining, at circuitry associated with the memory bank, whether to store the data read from the memory bank in the buffer based on whether the data read from the memory bank was in response to a memory access requests having the second priority level.

In another embodiment, executing the multiple memory access requests having the first priority level at block 412 comprises: executing, during the first clock cycle, one or more read requests at one or more respective first memory banks among a first subset of first memory banks; and executing, during the first clock cycle, one or more write requests at one or more respective first memory banks among a second subset of first memory banks.

In another embodiment, executing the one or more memory access requests having the second priority level at block 420 comprises executing one or more read requests by one or more respective second memory banks.

Some of the various blocks, operations, and techniques described above may be implemented utilizing hardware, a processor executing firmware instructions, a processor executing software instructions, or any suitable combination thereof. When implemented utilizing a processor executing software or firmware instructions, the software or firmware instructions may be stored in any suitable computer readable memory. The software or firmware instructions may include machine readable instructions that, when executed by one or more processors, cause the one or more processors to perform various acts such as described above.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A memory system, comprising:

a plurality of memory banks; and circuitry configured to:

receive a plurality of memory access requests having a first priority level, receive a plurality of memory access requests having a second priority level different than the first priority level, forward multiple memory access requests having the first priority level to a set of first memory banks to be executed by the set of first memory banks during a first clock cycle, determine one or more second memory banks that are not executing memory access requests having the first priority level during the first clock cycle, and in response to determining the one or more second memory banks that are not executing memory access requests having the first priority level during the first clock cycle, forward one or more memory access requests having the second priority level to the one or more second memory banks to be executed by the one or more second memory banks during the first clock cycle;

wherein the circuitry comprises, for each memory bank amongst at least some of the plurality of memory banks, a respective buffer and respective first circuitry configured to, for each read result output by the memory bank:

determine a priority level of a read request that corresponds to the read result, in response to determining that the priority level of the read request is the first priority level output the read result immediately, and in response to determining that the priority level of the read request is the second priority level, store the read result in the respective buffer for output from the respective buffer at a subsequent time.

2. The memory system of claim 1, wherein the respective buffers are respective first buffers, and wherein the circuitry comprises respective second circuitry associated with each of one or more of the first memory banks, each second circuitry including a second buffer configured to store memory access requests having the second priority level for later execution, the second circuitry configured to:

in response to receiving a first memory access request having the first priority level and a second memory access request having the second priority level in a same clock cycle, store the second memory access request in the second buffer for execution by the first memory bank during a subsequent clock cycle.

3. The memory system of claim 1, wherein the respective buffers are respective first buffers, and wherein the circuitry comprises second circuitry associated with one of the first memory banks, the second circuitry including a second buffer configured to store memory access requests having the second priority level for later execution, the second circuitry configured to:

receive one of the memory access requests having the first priority level during the first clock cycle;

receive one of the memory access requests having the second priority level during the first clock cycle;

in response to the second circuitry determining that the one first memory access request having the first priority level was received during the first clock cycle, store the one second memory access request having the second priority level in the second buffer; and in response to the second circuitry determining that no memory access requests having the first priority level were received during a second clock cycle that follows the first clock cycle, forward, to the one first memory bank during the second clock cycle, the one second memory access request having the second priority level for execution by the one first memory bank.

4. The memory system of claim 3, wherein the second circuitry is further configured to, in response to the second circuitry determining that no memory access requests having the first priority level were received during a third clock cycle between the first clock cycle and the second clock cycle:

retrieve another memory access request having the second priority level from the second buffer during the third clock cycle, the other memory access request having the second priority level having been received prior to receiving the third memory access request; and forward, to the one first memory bank during the third clock cycle, the other memory access request having the second priority level for execution by the one first memory bank.

5. The memory system of claim 1, wherein the circuitry comprises second circuitry associated with one of the second memory banks, the second circuitry configured to:

receive one of the memory access requests having the second priority level during the first clock cycle;

forward, to the one second memory bank during the first clock cycle, the one memory access request having the second priority level for execution by the one second memory bank.

6. The memory system of claim 5, wherein the second circuitry is configured to forward the one memory access request having the second priority level to the one second memory bank in response to at least to the second circuitry determining that no memory access requests having the first priority level were received by the second circuitry during the first clock cycle.

7. The memory system of claim 1, wherein the respective buffers are respective first buffers, and wherein the circuitry comprises second circuitry associated with one of the second memory banks, the second circuitry including a second buffer configured to store memory access requests having the second priority level for later execution, the second circuitry configured to:

receive one of the memory access requests having the second priority level during a second clock cycle prior to the first clock cycle;

store, in the second buffer, the one memory access request having the second priority level received during the second clock cycle;

retrieve, from the second buffer during the first clock cycle, the one memory access request having the second priority level that was received during the second clock cycle; and forward, to the one second memory bank during the first clock cycle, the one memory access request having the second priority level that was retrieved from the second buffer.

8. The memory system of claim 1, wherein the circuitry comprises:

selection circuitry configured to select an order for outputting data from the respective buffers of the at least some memory banks according to an arbitration algorithm.

9. The memory system of claim 8, further comprising, for each of the at least some of the plurality of memory banks:

respective demultiplexer circuitry that is configured to select whether to store the read result from the memory bank in the respective buffer based on whether the priority level of the read request that correspond to the read result from the memory bank is the second priority level.

10. The memory system of claim 1, wherein the memory system is configured to:

execute, during the first clock cycle, one or more read requests at one or more respective first memory banks among a first subset of first memory banks; and execute, during the first clock cycle, one or more write requests at one or more respective first memory banks among a second subset of first memory banks; and execute one or more read requests by one or more respective second memory banks.

11. The memory system of claim 10, further comprising:

control circuitry configured to, when i) a read request having the first priority level and corresponding to a first memory bank among the plurality memory banks and ii) a write request having the first priority level and corresponding to the first memory bank are received in a same clock cycle, give precedence to the read request and direct the read request to the first memory bank.

12. The memory system of claim 11, wherein the control circuitry is further configured to, when i) the read request having the first priority level and corresponding to the first memory bank and ii) the write request having the first priority level and corresponding to the first memory bank are received in the same clock cycle:

direct the write request to another memory bank that acts as a redundant memory bank.

13. A method for executing memory access requests by a memory system that includes a plurality of memory banks, the comprising:

receiving a plurality of memory access requests having a first priority level;

receiving a plurality of memory access requests having a second priority level different than the first priority level;

executing, by a set of first memory banks, multiple memory access requests having the first priority level during a first clock cycle;

determining, by the memory system, one or more second memory banks that are not executing memory access requests having the first priority level during the first clock cycle; and in response to determining the one or more second memory banks that are not executing memory access requests having the first priority level during the first clock cycle, executing, by the one or more second memory banks, one or more memory access requests having the second priority level during the first clock cycle; and for each memory bank amongst at least some of the plurality of memory banks, in response to each read result output by the memory bank:

determine a priority level of a read request that corresponds to the read result, in response to determining that the priority level of the read request is the first priority level, output the read result immediately, and in response to determining that the priority level of the read request is the second priority level, store the read result in a respective buffer corresponding to the memory bank for output from the respective buffer at a subsequent time.

14. The method for executing memory access requests of claim 13, wherein the respective buffers are respective first buffers, the method further comprising, for each of one or more of the first memory banks:

in response to receiving, at respective first circuitry associated with the first memory bank, a first memory access request having the first priority level and a second memory access request having the second priority level in a same clock cycle, storing the second memory access request in a respective second buffer associated with the first memory bank for execution by the first memory bank during a subsequent clock cycle.

15. The method for executing memory access requests of claim 13, wherein the respective buffers are respective first buffers, the method further comprising:

receiving, at first circuitry associated with one of the first memory banks, one of the memory access requests having the first priority level during the first clock cycle;

receiving, at the first circuitry, one of the memory access requests having the second priority level during the first clock cycle;

in response to the first circuitry determining that the one first memory access request having the first priority level was received during the first clock cycle, storing the one second memory access request having the second priority level in a second buffer of the first circuitry; and in response to the first circuitry determining that no memory access requests having the first priority level were received during a second clock cycle that follows the first clock cycle, executing, by the one first memory bank, the one second memory access request having the second priority level during the second clock cycle.

16. The method for executing memory access requests of claim 15, further comprising, in response to the first circuitry determining that no memory access requests having the first priority level were received during a third clock cycle between the first clock cycle and the second clock cycle:

retrieving another memory access request having the second priority level from the second buffer of the first circuitry during the third clock cycle, the other memory access request having the second priority level having been received prior to receiving the third memory access request; and executing, by the one first memory bank, the other memory access request having the second priority level during the third clock cycle.

17. The method for executing memory access requests of claim 13, further comprising:

receiving, at first circuitry associated with one of the second memory banks, one of the memory access requests having the second priority level during the first clock cycle;

wherein executing the one or more memory access requests having the second priority level during the first clock cycle comprises executing, by the one second memory bank, the one memory access request having the second priority level that was received during the first clock cycle.

18. The method for executing memory access requests of claim 17, wherein executing the one memory access request having the second priority level that was received during the first clock cycle is in response at least to the first circuitry determining that no memory access requests having the first priority level were received by the first circuitry during the first clock cycle.

19. The method for executing memory access requests of claim 13, wherein the respective buffers are respective first buffers, the method further comprising:

receiving, at first circuitry associated with one of the second memory banks, one of the memory access requests having the second priority level during a second clock cycle prior to the first clock cycle;

storing, in a second buffer of the first circuitry, the one memory access request having the second priority level received during the second clock cycle; and retrieving, from the second buffer during the first clock cycle, the one memory access request having the second priority level that was received during the second clock cycle;

wherein executing the one or more memory access requests having the second priority level during the first clock cycle comprises executing, by the one second memory bank, the one memory access request having the second priority level that was retrieved from the second buffer.

20. The method for executing memory access requests of claim 13, further comprising:

selecting, by the memory system, an order for outputting data from the respective buffers of the at least some memory banks according to an arbitration algorithm.

21. The method for executing memory access requests of claim 20, further comprising, for each of the at least some of the plurality of memory banks:

determining, at circuitry associated with the memory bank, whether to store the read result from the memory bank in the respective buffer based on whether the priority level of the read request that corresponds to the read result from the memory bank is the second priority level.

22. The method for executing memory access requests of claim 13, wherein executing the multiple memory access requests having the first priority level during the first clock cycle comprises:

executing, during the first clock cycle, one or more read requests at one or more respective first memory banks among a first subset of first memory banks; and executing, during the first clock cycle, one or more write requests at one or more respective first memory banks among a second subset of first memory banks.

23. The method for executing memory access requests of claim 22, wherein:

executing the one or more memory access requests having the second priority level during the first clock cycle comprises executing one or more read requests by one or more respective second memory banks.

* * * * *